United States Patent [19]

Shibasaki

[11] 3,767,052
[45] Oct. 23, 1973

[54] APPARATUS FOR SUPPORTING FILTER MEDIUM FOR FILTER PRESS

[75] Inventor: Katsutami Shibasaki, Osaka, Japan

[73] Assignee: Kurita Machinery Manufacturing Company Limited, Osaka, Japan

[22] Filed: Mar. 30, 1972

[21] Appl. No.: 239,491

[52] U.S. Cl.................. 210/225, 100/118, 210/400
[51] Int. Cl............................................. B01d 33/00
[58] Field of Search.................... 210/224–231, 400; 100/118, 119, 120, 198, 130

[56] References Cited
UNITED STATES PATENTS

| | | | |
|---|---|---|---|
| 3,613,563 | 10/1971 | Sumskaya | 100/198 |
| 3,690,462 | 9/1972 | Kurita | 210/225 |
| 3,698,557 | 10/1972 | Ishigaki | 210/225 |

Primary Examiner—Frank A. Spear, Jr.
Assistant Examiner—T. A. Granger
Attorney—Thomas B. Van Poole et al.

[57] ABSTRACT

A filter medium is disposed along the filtering face of each filter plate in the form of a double sheet and extends upwardly and downwardly of the filter plate in endless fashion. After completion of a filtering operation, the portion of the endless filter medium facing the prefilt is replaced with the other portion opposite to the prefilt side for passing the filtrate so that the portion of the medium facing the prefilt on which cake has been deposited during filtration serves as a portion for passing the filtrate during the subsequent filtering operation and is spontaneously washed by the passage of filtrate during filtration.

9 Claims, 5 Drawing Figures

3,767,052

APPARATUS FOR SUPPORTING FILTER MEDIUM FOR FILTER PRESS

BACKGROUND OF THE INVENTION

The present invention principally relates to a filter press of the type which comprises filter elements including filter plates or a combination of filter plates and filter frames and a filter medium such as filter cloth interposed between the filter elements to divide the filter elements into prefilt supply chambers communicating with a prefilt supply passage and filtrate chambers communicating with a filtrate discharge passage. With this type of filter press, prefilt is supplied to the apparatus with the filter elements in pressing contact with each other to effect filtration and the elements are thereafter separated to remove cake from the prefilt supply chambers, whereby a cycle of filtering operation is completed.

With the conventional filter press described, the filter medium will get clogged during each cycle of filtration. The filtering operation may be conducted repeatedly with the clogged medium until it is worn out, but repeated use of the clogged medium will not only change filtration performance but also promptly render the medium worn out, hence uneconomical.

To eliminate the above-mentioned clogging for repeated use of the filter medium, so-called "thorough washing" method is known in which during the interval of filtering operation a wash liquor is passed through the press in a direction opposite to that of filtration. Another method is also known wherein all the parts of filter medium used for filtration are washed thoroughly at a suitable time by a washing device provided independently of the filter elements of the filter press. According to another method, the filter medium is washed by a plurality of washing devices every time filtration is over. However, the first-mentioned method is disadvantageous in that the operation of the filter press has to be interrupted completely to conduct thorough washing, which results in a very low operation efficiency. Moreover, thorough washing requires additional equipment and labor. The second and third methods also require additional washing devices, with the consequent disadvantage that the filter press becomes more complex and expensive.

SUMMARY OF THE INVENTION

An object of this invention is to eliminate the foregoing drawbacks heretofore experienced by providing a filter press wherein an endless filter medium is disposed between adjacent filter elements in the form of a double sheet so that after completion of each cycle of filtration one portion of the endless filter medium facing the prefilt can be successively replaced with the other portion thereof opposite to the prefilt side and facing the filtrate. Thus, the portion of the filter medium facing the prefilt on which cake has been deposited during filtration is brought to the filtrate side and thoroughly and spontaneously washed with a flow of filtrate during the subsequent filtering operation.

Another object of this invention is to provide cake removing means for each filter medium whereby removal of cake and washing of the medium can be effected more completely without impairing efficiency of the filter press in continuous operation.

According to this invention, an endless filter medium is provided for one filter face in movable manner so that a plane of the medium for effecting filtration will be subsequently so displaced as to act as a plane to be washed. In a modified embodiment, an endless filter medium is used for two filter faces of one plate. Thus, every time a filtering operation is completed, the portion of endless medium facing a prefilt supply chamber in each filter element can be successively replaced with the other portion facing a filtrate discharge chamber, permitting the former portion on which cake has been deposited to be thoroughly washed with a flow of filtrate during the subsequent filtering operation.

In accordance with this invention, excess pressure to be exerted by the prefilt on the filter medium due to its clogging can be avoided to make the filter medium serviceable for the greatest possible period. Since thorough washing is conducted during each cycle of filtration, there arise no changes in the performance of the filter press during repeated filtering operations but the highest performance can be assured all the time.

The present invention further assures continuous filtration inasmuch as the thorough washing is conducted during usual process of filtration and the filter medium is moved during a period of time when the plates and frames are separated as usually required for the removal of cake or before the filter elements are pressed together for the subsequent operation. Moreover, the invention does not require any of complex washing devices.

In addition to thorough washing, cake removing means of a very simple construction as shown in the embodiment gives an improved washing ability without impairing any of the foregoing features and serves to greatly reduce the amount of cake to be contained in the filtrate and thereby mitigate or eliminate troubles to be otherwise experienced due to the presence of cake.

BRIEF DESCRIPTION OF THE DRAWINGS

With reference to the drawings, filter plates are indicated at 1 and filter frames at 2. As well known, the filter plate 1 is formed with recesses in its opposite faces for the filtrate. As seen in FIGS. 1 and 3, filter plates 1 and filter frames 2 are arranged alternately with an endless filter medium 3 extending between the plate 1 and frame 2. In FIG. 3 a prefilt supply chamber 5 communicates with a prefilt supply passage 4 and a filtrate discharge chamber 7 communicates with a filtrate discharge passage 6. A prefilt is supplied for filtration to the filter press with the plates and frames in pressing contact with each other and, after filtration, the parts are separated to remove cake from the prefilt supply chamber 5. The endless filter medium 3 extends upwardly and downwardly of the plate 1 and frame 2 and passes around rollers 11 and 12. One of the two planes of the endless filter medium 3 provides a portion 3a facing the prefilt supply chamber 5 and the other provides a portion 3b facing the filtrate discharge chamber 7. After filtration, the filter medium 3 is moved by the rotation of the roller 11 which is driven by drive means 8 on a support frame in timed relation to the separation of the plate 1 and frame 2, whereby the portion facing the filter plate is displaced for replacement.

Figure 1:
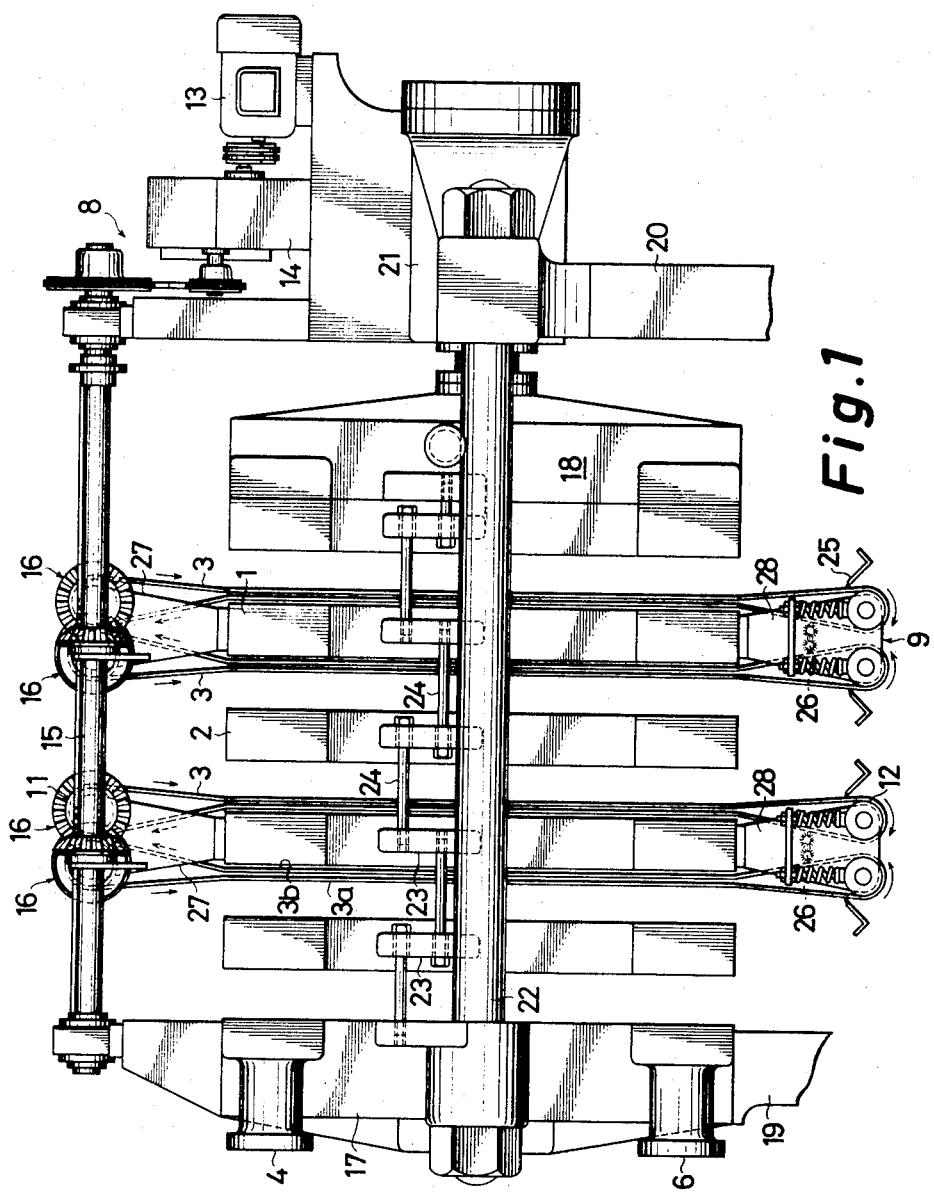
FIG. 1 is a side elevation showing a preferred embodiment of this invention.
Figure 2:
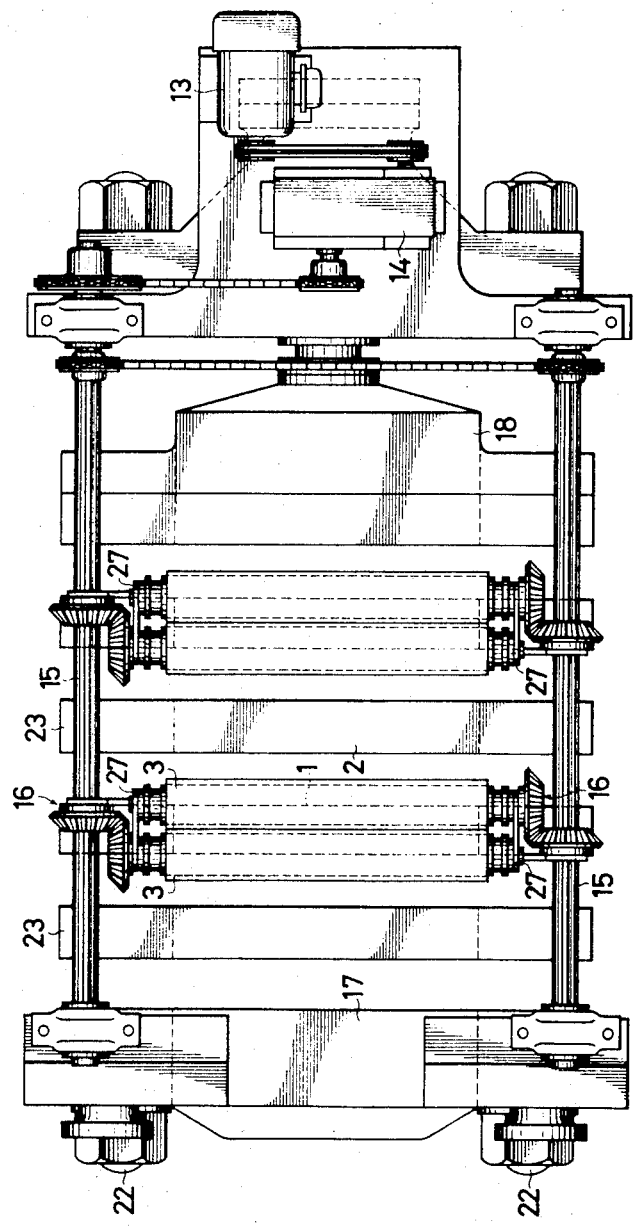
FIG. 2 is a plan view of the same.
Figure 3:
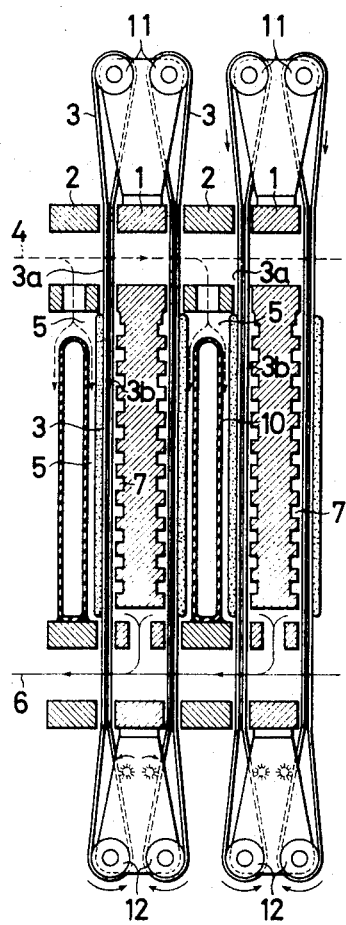
FIG. 3 is a view in section illustrating part of FIG. 1.

According to the embodiment shown in FIGS. 1 and 2, the prefilt supply chamber 5 accommodates a flexible container 10 for squeezing purposes. Each pair of filter mediums 3 disposed between the plates 1 as well as between the frames 2 are independently provided as an endless member reeved around a pair of upper and lower rollers 11 and 12. The drive means 8 comprises a drive source 13, a pair of rotary shafts 15 and 15 to be driven by the drive source 13 through a reduction gear 14 or the like and gear means 16 movable by following the upper rollers 11 carrying the endless filter mediums 3 which gear means deliver the rotation of the rotary shafts 15. Every time each plate 1 and each frame 2 are separated after completion of filtration as shown in FIG. 1, the drive means 8 replaces the portion 3a of the filter medium 3 facing the prefilt supply chamber 5 with the portion 3b facing the filtrate discharge chamber 7. The drive means 8 is initiated into operation when the drive source 13 is given an actuating signal by the switching of a limit switch which is operated by the movement of a movable end plate 18 adapted to advance or retract to press the plates 1 and frames 2 against a stationary end plate 17 or to separate the same. Alternatively, the drive means 8 may be actuated by the operation of an unillustrated clutch included in a power transmission system associating the drive source 13 with the roller 11. The amount of rotation to be given to the roller 11 is governed by controlling the drive source 13 or the clutch by desired means, for example, by the combination of an unillustrated timer or cam in operative relation to the power transmission system and a switch to be thereby operated or by a limit switch which detects the movement of the endless filter medium within the desired range. It will be apparent that such control can be achieved by mechanical or electrical means or by the combination thereof.

Indicated at 19 is a support frame carrying the stationary end plate 17 and at 20 another support frame equipped with a hydraulic cylinder 21 for advancing and retracting the movable end plate 18. A pair of opposite side bars 22 extending between both support frames 19 and 20 support the plates 1 and frames 2 in movable manner, with their handles 23 bearing on the side bars 22. Equidistant bolts 24 are provided between each adjacent members of the stationary end plate 17, filter plates 1, filter frames 2 and movable end plate 18 so that the plates 1 and frames 2 can be pressed together against the stationary end plate 17 or separated equidistantly from one another as the movable end plate 18 is advanced or retracted.

Cake removing means 9 comprises a scraper 25 and cleaning brushes 26 disposed at a lower portion of the endless filter medium 3 in proximity to its peripheral face. When desired, the cleaning brush 26 may be a washer brush which forces out a wash liquor.

The drive source 13 and reduction means 14 are mounted on the support frame 20. The rotary shafts 15 and 15 extend between and supported on the stationary end plate 17 and support frame 20. The upper and lower rollers 11 and 12 for providing the endless filter medium are mounted on brackets 27 and 28 which are fixed to the upper and lower portions of the filter plate 1 in pairs. It is preferred that the cleaning brush 26 be driven in a direction opposite to that of movement of the filter medium 3.

To perform filtration, the movable end plate 18 is first advanced to press the plates 1 and frames 2 against the stationary end plate 17. A prefilt is then supplied between the plates 1 through the prefilt supply passage 4. After closing the passage 4, a pressure fluid is introduced into the flexible containers 10 to inflate the same and thereby effect filtration by squeezing. During filtration, the portion 3a of the endless filter medium 3 facing the prefilt supply chamber 5 comes into direct contact with cake resulting from filtration and the cake is deposited on its surface. After the filtration, the movable end plate 18 is retracted and the plates 1 and frames 2 are separated, whereby the tightly sealed prefilt chamber 5 is opened, causing the cake in its interior to drop or to be removed.

Upon the separation, the drive means 8 is initiated into operation to drive the endless filter medium 3 so that the portion 3b of the endless filter medium 3 facing the filtrate discharge chamber 7 during filtration is brought into facing relation to the prefilt supply chamber 5, with the portion 3a facing the prefilt supply chamber 5 brought to the position facing the filtration discharge chamber 7.

Upon lapse of a given period of time after the retraction of the movable end plate 18, the movable end plate 18 is advanced according to a predetermined program to effect filtration in the same manner as above. During this filter operation, liquid to be filtered passes through the portions 3b and 3a of the filter medium successively. This flow takes place in a direction opposite to that in the previous operation with respect to the filter medium, with the result that, at the initial stage of passage of the liquid, the portion 3a is washed by the reverse flow whereby clogging of the filter medium is eliminated or a relatively small amount of cake is washed off the surface and discharged from the filtrate discharge passage along with the filtrate.

Filtration is continuously carried out by repeating the foregoing procedures. The filtrate discharged at the initial stage of each cycle of filtering operation contains a small amount of cake which has been washed off the filter medium. Accordingly, initial portion of the filtrate may preferably be fed back to the prefilt by an automatic operation of a valve for a filtrate recovery channel.

When the filter medium is moved subsequent to completion of each cycle of filtering operation, the cake removing means 8 removes the remaining cake off the portion 3a or 3b on which the cake has been deposited so as to minimize the amount of cake to be washed off during filtration and to thereby reduce the amount of filtrate to be returned to the prefilt for improved performance of the filter press.

Figure 5:
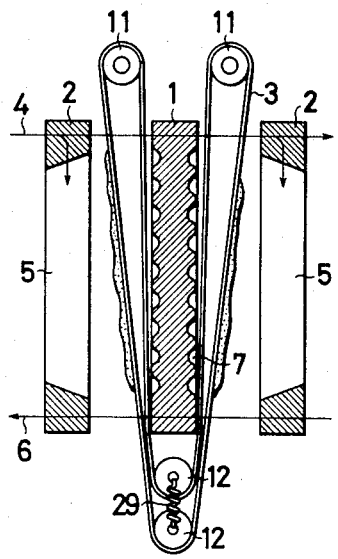
FIG. 5 is a view in section showing a modified embodiment.
Figure 4:
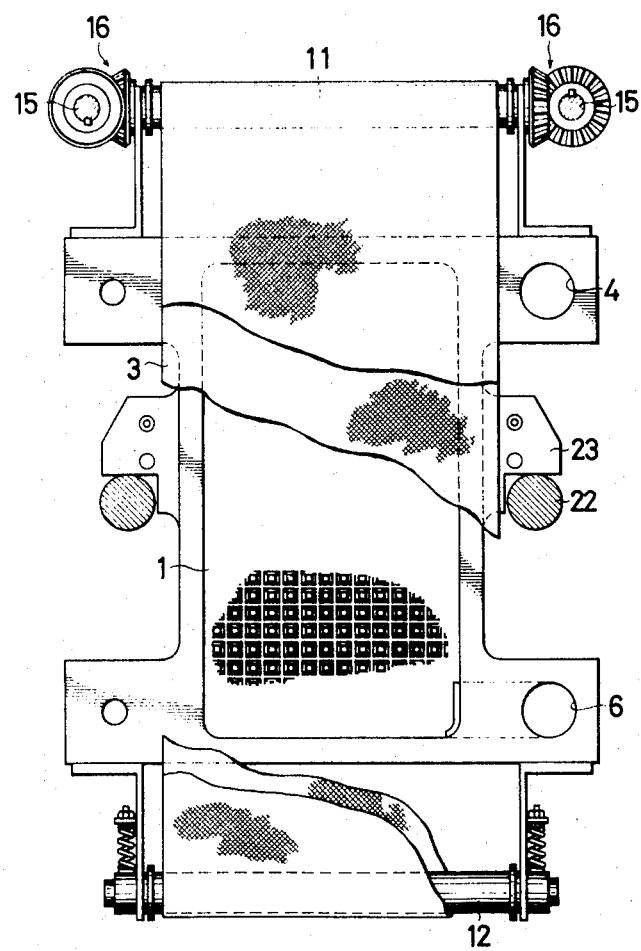
FIG. 4 is a front view of part of FIG. 3.

FIG. 5 shows a modified embodiment wherein a pair of filter mediums interposed between the plate 1 and frames 2 are provided in the form of a double endless medium 3 which is movably supported on two upper rollers 11 and two lower rollers 12, with one positioned above the other. A spring 29 extends between the rollers 12 and 12 to bring the filter medium 3 into vibration so as to permit cake to drop spontaneously with greater ease when the plate 1 and frames 2 are separated.

The filter mediums may be connected together into an endless form in the desired fashion, or the endless medium 3 may be supported in place by the desired means. The arrangement wherein one portion of medium facing the prefilt supply chamber 5 during a filtering operation is brought into facing relation to the filtrate discharge chamber 7 during the subsequent operation may be incorporated in other types of filter press insofar as the previously described functions can be achieved. Further the drive means for the endless filter medium is not limited to the construction of the embodiment. For instance, rack members may be mounted on the upper and lower portions of opposite support frames in parallel with the side bars for meshing engagement with pinions on the ends of shafts of the drive rollers for the endless filter medium so as to rotate the pinions.

What is claimed is:

1. A filter press including a plurality of filter plates, each filter plate having first and second grooved faces, a first filter cloth associated with the first grooved face comprising an individual closed loop of filter cloth supported on upper and lower rollers adjacent said first grooved face and of sufficient size to cover said first grooved face so that said loop of cloth provides an inner filter cloth portion and an outer filter cloth portion with the inner filter cloth portion being in an inner position against and immediately adjacent said first grooved face and the outer filter cloth portion lying against said inner filter cloth portion to provide a double thickness of filter cloth and means for pressuring filtrate first through said outer filter cloth portion, then through said inner filter cloth portion into the grooves of said first grooved face so that solid particles in said filtrate are deposited on said outer filter cloth portion and means for receiving filtrate from the grooves of said first grooved face for removal from said filter press.

2. The invention of claim 1 additionally including drive means for rotating the rollers supporting the loop of filter cloth to reverse the positions of the inner portion of filter cloth and the outer portion of filter cloth subsequent to a filtering operation.

3. The invention of claim 2 additionally including scraper means engageable with said loop of filter cloth for scraping solid material from said outer portion of filter cloth during movement of said outer portion of filter cloth on said roller means to said inner position.

4. The invention of claim 3 additionally including brush means engageable with said loop of filter cloth for aiding in the removal of solid particles from said filter cloth as it moves past said brush means.

5. The invention of claim 1 wherein each filter plate is additionally associated with a second closed loop of filter cloth supported on upper and lower rollers to extend adjacent said second grooved face to provide an inner filter cloth portion engageable with said second grooved face and an outer filter cloth portion engageable with the inner filter cloth portion engaging said second grooved face so that pressurized filtrate can be forced through said outer and inner portions of said second filter cloth loop to enter the grooves of said second grooved face.

6. The invention of claim 5 wherein a plurality of said filter plates are mounted on clamping support means and additionally including a hollow filter frame means positioned between adjacent filter plates and having an inlet for filtrate, an expandable bladder mounted on said hollow filter frame between adjacent filter plates and comprising the means for pressurizing filtrate through the filter cloth portion of adjacent filter plates facing said hollow filter frame.

7. The invention of claim 6 additionally including drive means for rotating the upper rollers supporting the first and second loops of filter cloth to reverse the positions of the inner portions of filter cloth and the outer portions of filter cloth of ach loop subsequent to a filtering operation.

8. The invention of claim 7 additionally including scraper means engageable with said loops of filter cloth for scraping solid material from said outer portions of each of said loops of filter cloth during movement of said outer portions of filter cloth on said roller means to said inner position.

9. The invention of claim 8 additionally including brush means engageable with said loops of filter cloth for removing solid particles from said cloth as the cloth moves past the brush means.

* * * * *